(12) United States Patent
Brown

(10) Patent No.: US 6,581,657 B1
(45) Date of Patent: Jun. 24, 2003

(54) DISPOSITION OF TRANSPONDER COUPLING ELEMENTS IN TIRES

(75) Inventor: Robert Walter Brown, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/031,514

(22) PCT Filed: Aug. 16, 1999

(86) PCT No.: PCT/US99/18666

§ 371 (c)(1),
(2), (4) Date: Jan. 16, 2002

(87) PCT Pub. No.: WO01/12452

PCT Pub. Date: Feb. 22, 2001

(51) Int. Cl.[7] .......................... B60C 23/00; B60C 23/04; B60C 19/00
(52) U.S. Cl. .................... 152/152.1; 152/454; 152/517; 152/526
(58) Field of Search .............................. 152/152.1, 517, 152/526, 454; 340/442–448, 438; 73/146.5

(56) References Cited

U.S. PATENT DOCUMENTS

| 3,665,387 A | 5/1972 | Enabnit |
| 3,831,161 A | 8/1974 | Enabnit |
| 3,872,424 A | 3/1975 | Enabnit |
| 4,052,696 A | 10/1977 | Enabnit |
| 4,099,157 A | 7/1978 | Enabnit |
| 4,108,701 A | 8/1978 | Stanley |
| 4,168,198 A | 9/1979 | Stanley |
| 4,911,217 A | 3/1990 | Dunn et al. |
| 5,181,975 A | 1/1993 | Pollack et al. |
| 5,218,861 A | 6/1993 | Brown et al. |
| 5,218,862 A | 6/1993 | Hurrell, II et al. |
| 5,479,171 A * | 12/1995 | Schuermann ........ 152/152.1 X |
| 5,500,065 A | 3/1996 | Koch et al. |

FOREIGN PATENT DOCUMENTS

| EP | 0657836 A1 | 6/1995 |
| WO | WO99/29522 | 6/1999 |
| WO | WO01/12453 | 2/2001 |

* cited by examiner

Primary Examiner—Adrienne C. Johnstone
(74) Attorney, Agent, or Firm—Howard M. Cohn

(57) ABSTRACT

A pneumatic radial ply tire (500, 600, 900, 1000, 1100, 1200, 1300, 1400) having a tread (538, 638, 938, 1038, 1138, 1238, 1338, 1438), a carcass structure (560, 660, 960, 1060, 1160, 1260, 1360, 1460) and a belt structure (546, 646, 946, 1046, 1146, 1246, 1346, 1446) has an electrically conductive and electrically continuous single-turn hoop (510, 610, 910, 1010, 1110, 1410) disposed about the circumference of the tire. The hoop might be provided as a coupling element in a transponder and interrogator system and in some designs as a structural element of the tire.

12 Claims, 9 Drawing Sheets

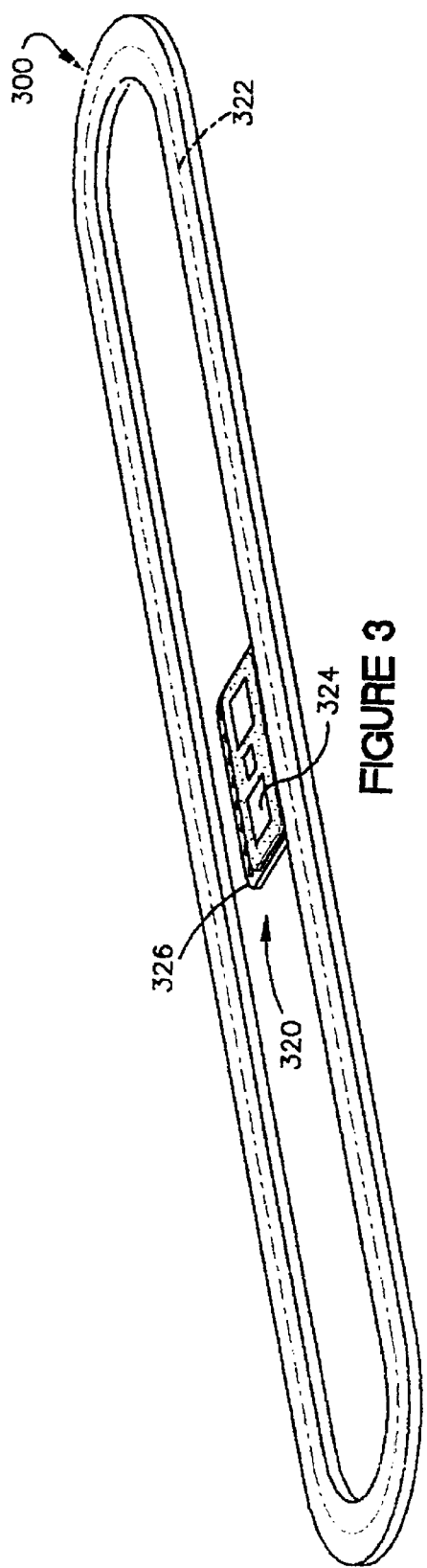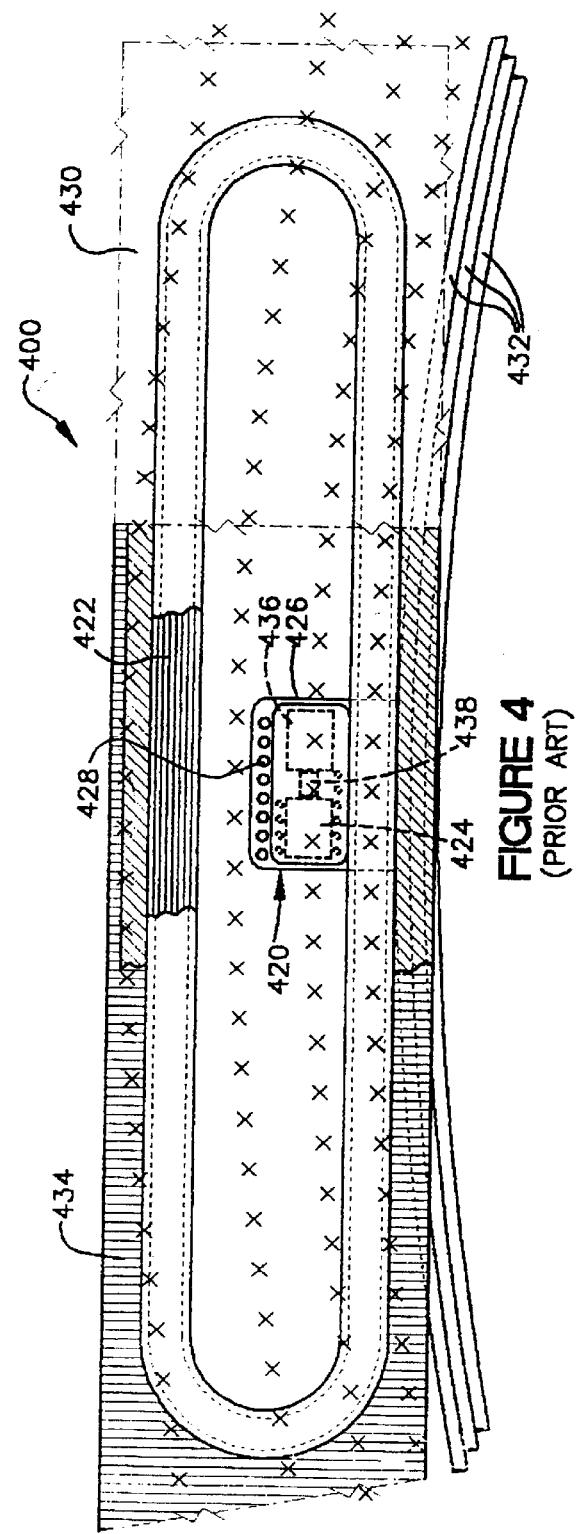

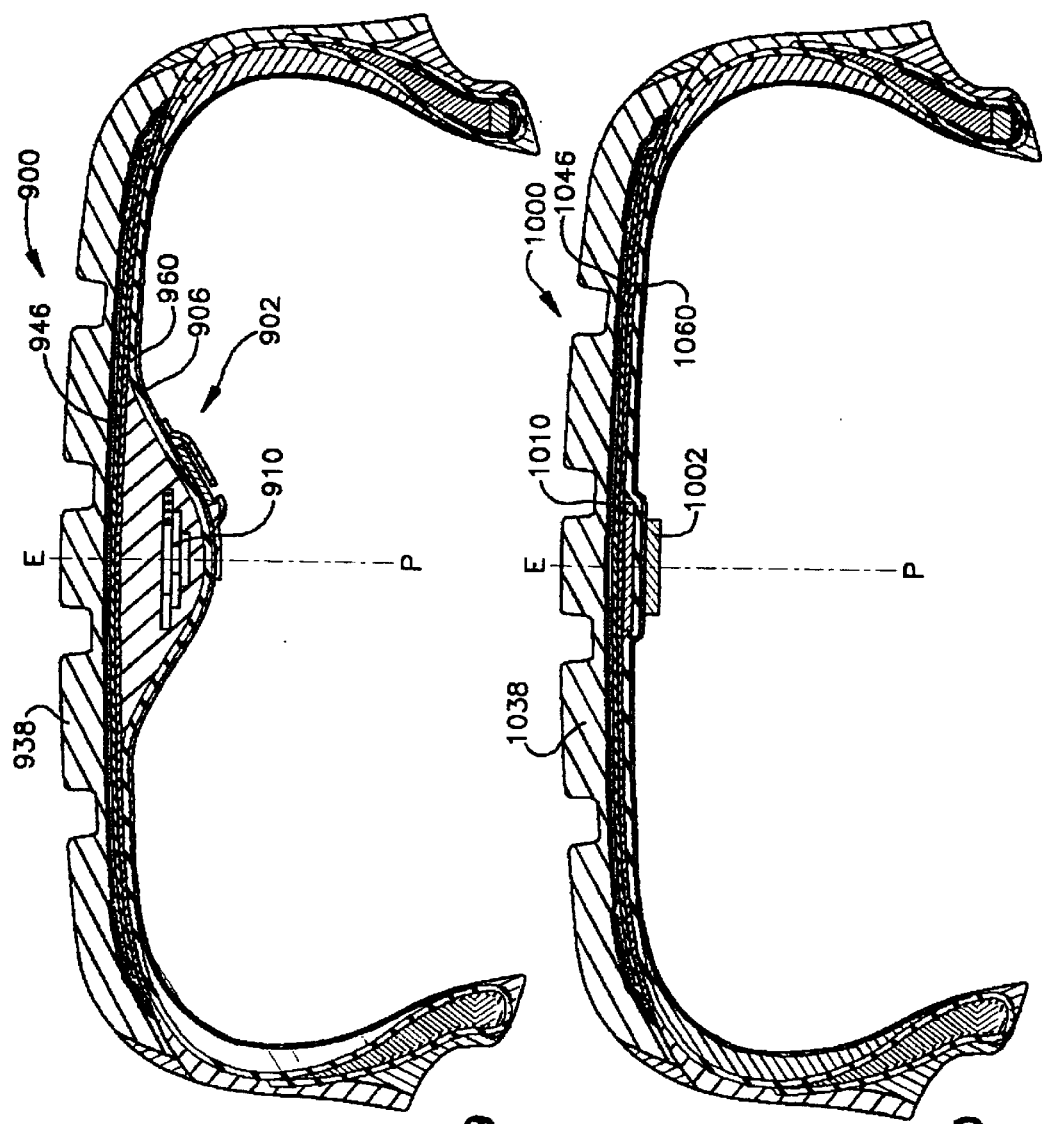

DISPOSITION OF TRANSPONDER COUPLING ELEMENTS IN TIRES

TECHNICAL FIELD

This invention relates to a pneumatic tire incorporating an integrated circuit transponder for use in tire identification and for the transmission of such tire data as temperature and pressure and the like. More particularly, the invention relates to the combination of a transponder and an electromagnetic coupling element and to the disposition of both within a tire.

BACKGROUND OF THE INVENTION

For a century, the Goodyear Tire & Rubber Company of Akron Ohio, assignee of the present invention, has been the uncontested industry leader in tire product technology.

For example, as early as 1892, a puncture-resistant tire was patented. In 1934, a year recognized as the beginning of the runflat era, Goodyear introduced the Lifeguard (tm) safety tube, a fabric tube within the tire, used commercially by auto makers and on trucks. In 1993, Goodyear's Eagle GS-C EMT (Extended Mobility Technology) won the Discover Award for Automotive Technological Innovation. In 1996, the Goodyear Eagle F1 runflat tire was chosen as standard equipment on the 1997 Chevrolet C-5 Corvette.

Other examples of the strides Goodyear has taken in the advancement of tire and related technologies include, but are not limited to, the following patented inventions:

Commonly-owned U.S. Pat. No. 3,665,387 (Enabnit; 1972), entitled SIGNALLING SYSTEM FOR LOW TIRE CONDITION ON A VEHICLE, incorporated in its entirety by reference herein, discloses a low tire pressure warning system adaptable for any number of wheels of a vehicle and providing dashboard indications of system operation and low pressure conditions while the vehicle is in motion.

Commonly-owned U.S. Pat. No. 3,831,161 (Enabnit; 1974), entitled FAIL-SAFE MONITORING APPARATUS, incorporated in its entirety by reference herein, discloses monitoring vehicle tire pressure wherein the operator is warned of an abnormal or unsafe condition of one or more of the tires.

Commonly-owned U.S. Pat. No. 3,872,424 (Enabnit; 1975), entitled APPARATUS AND METHOD FOR TRANSMITTING AUXILIARY SIGNALS ON EXISTING VEHICLE WIRING, incorporated in its entirety by reference herein, discloses communicating with low tire pressure monitoring circuits using power pulses carried on existing vehicle wiring (e.g., the turn signal circuits).

Commonly-owned U.S. Pat. No. 4,052,696 (Enabnit; 1977), entitled TIRE CONDITION MONITOR, incorporated in its entirety by reference herein, discloses a tire condition sensing circuit that includes a ferrite element that changes from a ferromagnetic to a non-ferromagnetic state in response to a temperature increase above the material's Curie point.

Commonly-owned U.S. Pat. No. 4,099,157 (Enabnit; 1978), entitled SINGLE WIRE POWER/SIGNAL SYSTEM FOR VEHICLE AUXILIARY DEVICES, incorporated in its entirety by reference herein, discloses providing both power to and receiving detection signals from a remotely located condition monitoring device using a single wire with ground return through the vehicle frame.

Commonly-owned U.S. Pat. No. 4,108,701 (Stanley; 1978), entitled METHOD FOR MAKING HOSE INCORPORATING AN EMBEDDED STATIC GROUND CONDUCTOR, and related U.S. Pat. No. 4,168,198 (Stanley; 1979), entitled APPARATUS FOR MAKING HOSE INCORPORATING AN EMBEDDED STATIC GROUND CONDUCTOR, both incorporated in their entirety by reference herein.

Commonly-owned U.S. Pat. No. 4,911,217 (Dunn, et. al.; 1990), entitled INTEGRATED CIRCUIT TRANSPONDER IN A PNEUMATIC TIRE FOR TIRE IDENTIFICATION, incorporated in its entirety by reference herein, discloses an RF transponder in a pneumatic tire. FIG. 1a of this patent illustrates a prior-art identification system ("reader") that can be used both to interrogate and provide energy to the transponder inside the tire. The identification system includes a portable hand-held module having within it an exciter and associated circuitry for indicating to a user the numerical identification of the tire/transponder in response to an interrogation signal.

Commonly-owned U.S. Pat. No. 5,181,975 (Pollack, et. al.; 1993), entitled INTEGRATED CIRCUIT TRANSPONDER WITH COIL ANTENNA IN A PNEUMATIC TIRE FOR USE IN TIRE IDENTIFICATION, incorporated in its entirety by reference herein, discloses a pneumatic tire having an integrated circuit (IC) transponder and pressure transducer. As described in this patent, in a tire that has already been manufactured, the transponder may be attached to an inner surface of the tire by means of a tire patch or other similar material or device.

Commonly-owned U.S. Pat. No. 5,218,861 (Brown, et al.; 1993), entitled PNEUMATIC TIRE HAVING AN INTEGRATED CIRCUIT TRANSPONDER AND PRESSURE TRANSDUCER, incorporated in its entirety by reference herein, discloses a pneumatic tire having an integrated circuit (IC) transponder and pressure transducer mounted within the pneumatic tire. Upon interrogation (polling) by an external RF signal provided by a "reader", the transponder transmits tire identification and tire pressure data in digitally-coded form. The transponder is "passive" in that it is not self-powered, but obtains its operating power from the externally-provided RF signal.

The commonly-owned U.S. Patents referenced immediately hereinabove are indicative of the long-standing, far-reaching and ongoing efforts being made by the Goodyear Tire & Rubber Company in advancing tire product technology. In particular, the lattermost patent, U.S. Pat. No. 5,218,861 ('861), describes "a pneumatic truck tire having an integrated circuit transponder including an antenna coil which functions as a secondary winding coupled to the annular tensile member formed from steel wire and acting as a primary winding in the manner described above." The "annular tensile member" referred to is specifically one of the tire's two spaced-apart beads which is, in effect, used as the primary winding of a transformer whose secondary winding is the antenna coil of the transponder installed within the tire. U.S. Pat. No. 4,911,217, is referenced in the '861 patent as utilizing this same sort of electric-field coupling (col. 5, 1. 10+).

The '861 patent describes difficulties of incorporating the large-loop antennas of transponders into the tire manufacturing process wherein the tire must undergo a "blow up" from a cylindrical shape into the familiar toroidal shape of tires. The use of a small planar loop antenna, as the secondary winding of a transformer and one of the tire beads as the primary winding, enables the interrogation of a tire-mounted transponder from any position about the bead. Unfortunately, while the bead thus used enables easy communication between the transponder and the interrogator device when the tire is unmounted upon a metal wheel—the use of the bead as the primary winding is adversely influenced by the close proximity of the bead to the wheel when the tire is in use. In other words, the use of the tire bead as the primary winding in a magnetically coupled transponder system presents difficulties associated with the close proximity between the tire bead and the closely adjacent metallic wheel which presents the potential for interference with the RF communication between the transponder and the external interrogator which activates the transponder.

SUMMARY OF THE INVENTION

The present invention relates to a pneumatic radial ply runflat tire having a tread, a carcass comprising a radial ply structure having two or more plies, a belt structure comprising two or more belts located between the tread and the radial ply structure, an innerliner and two sidewalls each reinforced by one or more wedge inserts, and an electrically conductive and electrically continuous, single-turn hoop disposed radially inward of the tread and belt structure and radially outward of the carcass structure. The function of the hoop is that of a coupling element in a transformer comprising the hoop as the primary winding and the coil of a tire-mounted transponder as the secondary winding such that the tire-mounted transponder would have 360-degree readability about the circumference of the tire by a transponder interrogator that is external to the tire. The electrically continuous single-turn hoop has an electrical resistance about its circumference of preferably less than 10 ohms and is constructed of material resistant to fatigue and corrosion in the environment of an interior of a pneumatic tire. The electrically continuous single-turn hoop is more or less rectangular in cross section and is made from a solid band of electrically conductive material. Or the hoop can be made from a multiplicity of strands of electrically conductive material suitable to resist fatigue failure or of a single strand or wire of electrically conductive material that is non-rectangular in cross section. The plane of the hoop could contain the equatorial plane of the tire or it could lie on either side of the equatorial plane of the tire. The hoop could be disposed between any two of the two or more belts of the belt structure or radially outward of the belt structure and radially inward of the tread. Such a coupling element hoop is intended also to be used in conjunction with a tire-mounted transponder within a tire that is not designed for runflat operation.

The transponder coupling-element hoop of the present invention is intended for use in tires having a belt structure having two laterally spaced apart sides that are disposed more or less symmetrically with respect to each other about the equatorial plane of the tire. More specifically, the electrically conductive and electrically continuous single-turn hoop would be disposed radially inward of the tread and between the two laterally spaced apart portions of the belt structure. The hoop would have the above described properties of cross-sectional shape and solid or stranded structure and an electrical resistance about the circumference of the tire of preferably less than 10 ohms.

The invention contemplates yet further the use of a tread-supporting structural hoop in the role of a primary winding in a coupling-element transformer allowing 360-degree readability of a tire-mounted transponder. Such a structural hoop would have the above described electrical properties of a single-turn, electrically continuous loop having an electrical resistance of preferably less than 10 ohms about the circumference of the tire.

Other benefits and advantages of the invention will become apparent to those skilled in the art to which it pertains upon a reading and understanding of the following detailed specification.

BRIEF DESCRIPTION OF THE DRAWINGS

Reference will be made in detail to preferred embodiments of the invention, examples of which are illustrated in the accompanying drawings. The drawings are intended to be illustrative, and not to be limiting. Although the invention will be described in the context of these preferred embodiments, it should be understood that the specific embodiments are not intended to limit the spirit and scope of the invention to these particular embodiments.

Certain elements in selected ones of the drawings may be illustrated not-to-scale, for illustrative clarity.

Figure 1A:
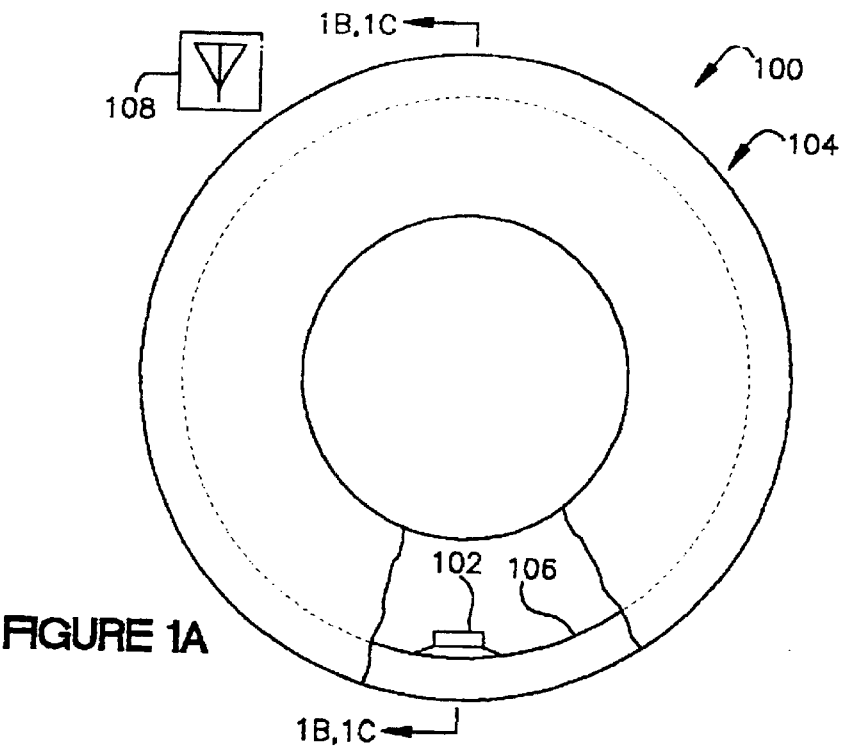

Often, similar elements throughout the drawings may be referred to by similar references numerals or even by the same reference numeral. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract.

In some cases, similar elements may be referred to with similar numbers in a single drawing. For example, a plurality of elements 199 may be referred to as 199*a*, 199*b*, 199*c*, etc.

The cross-sectional views, if any, presented herein may be in the form of "slices", or "near-sighted" cross-sectional views, omitting certain background lines which would otherwise be visible in a true cross-sectional view, for illustrative clarity.

Figures 1B, 1C:
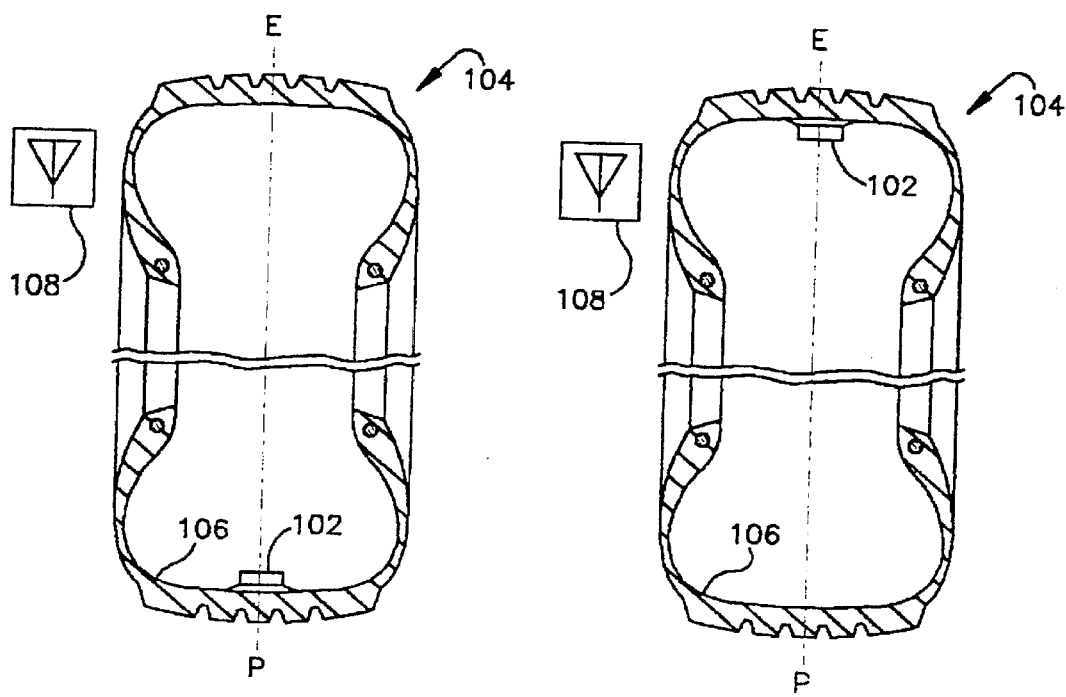
Figure 2A:
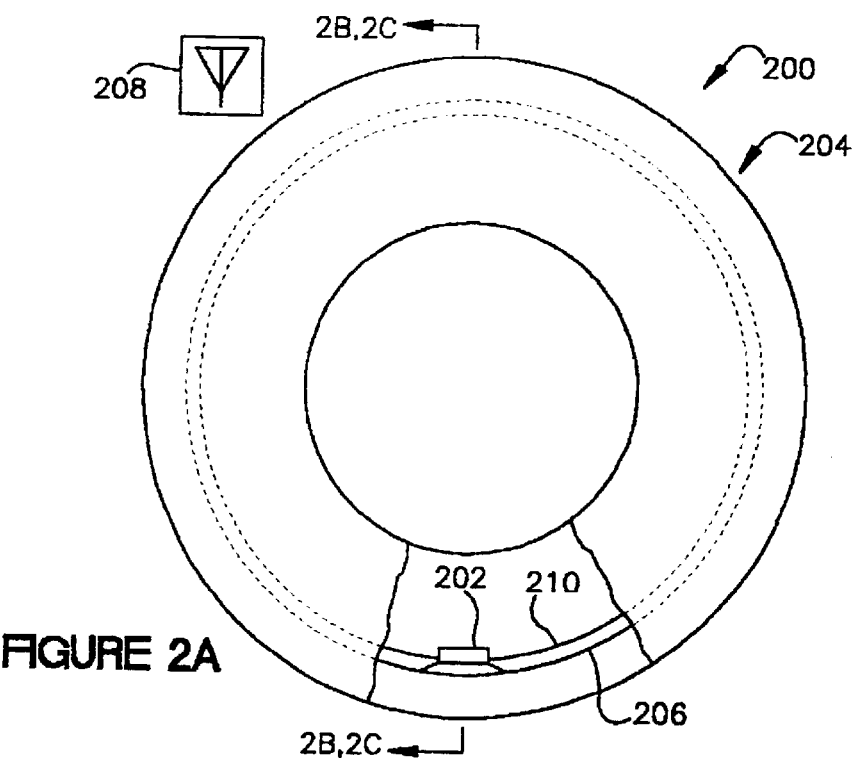
Figures 2B, 2C:
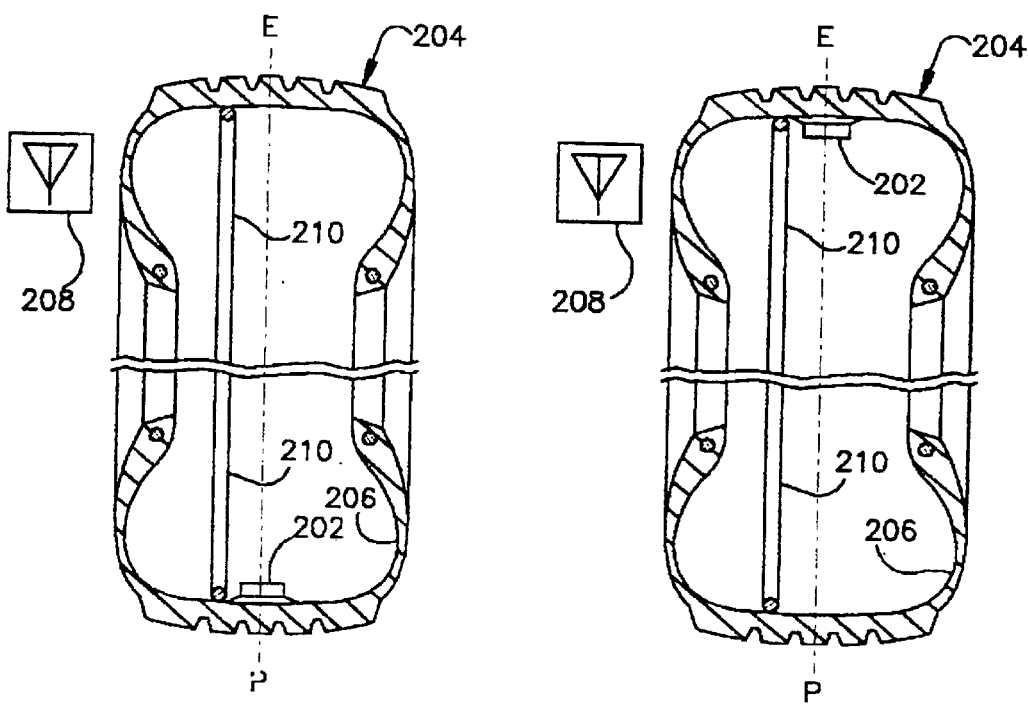
Figure 5:
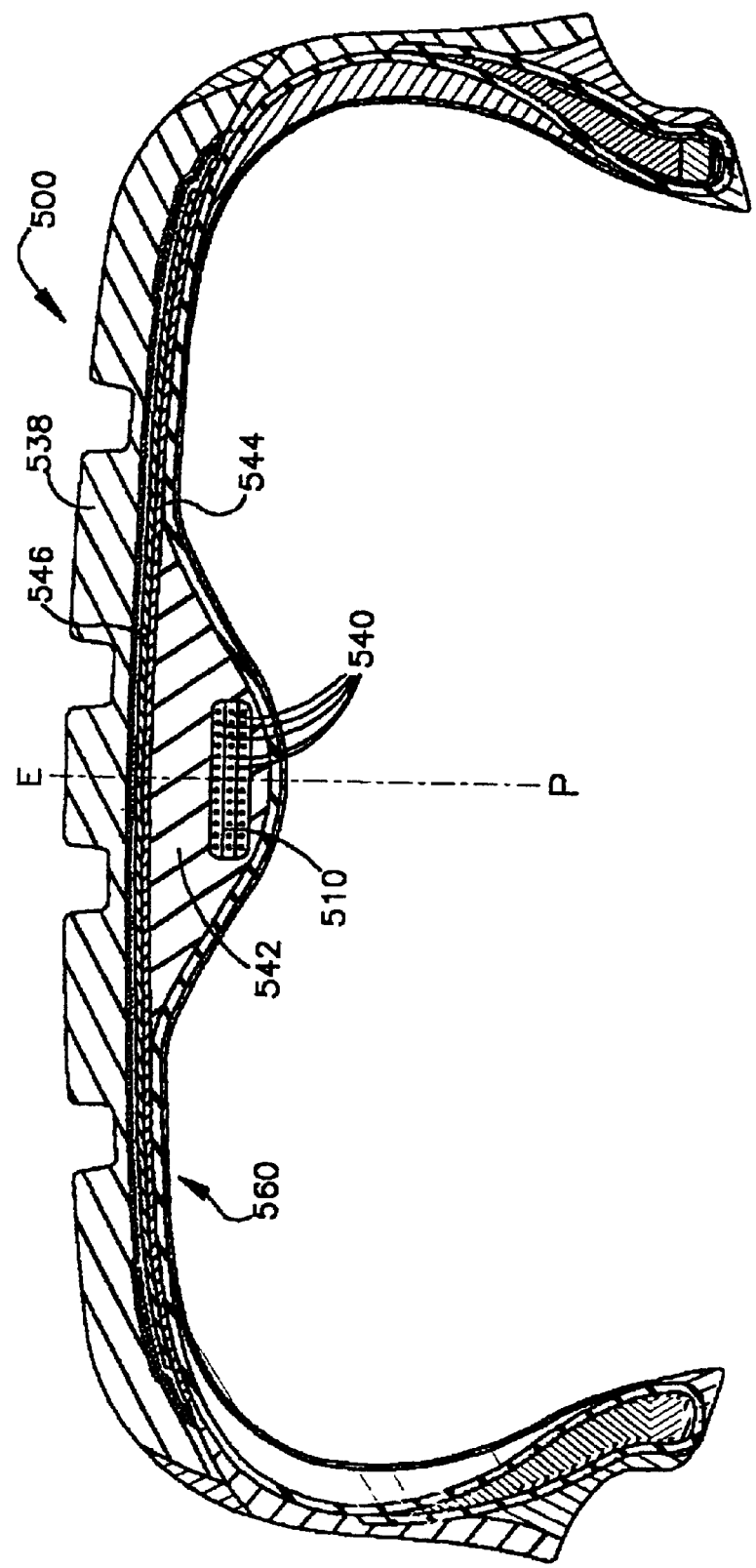
Figure 6:
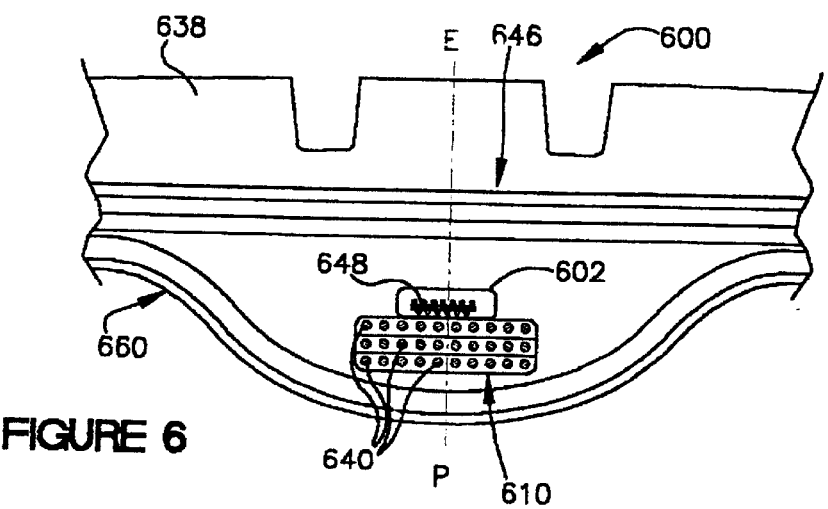
Figure 7A:
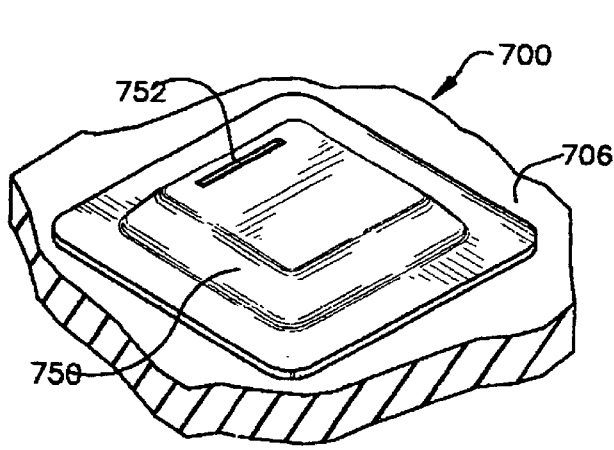
Figure 7B:
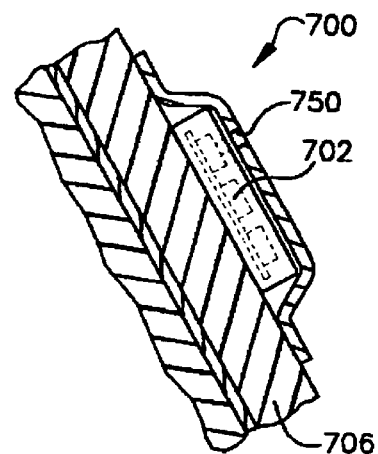
Figure 8A:
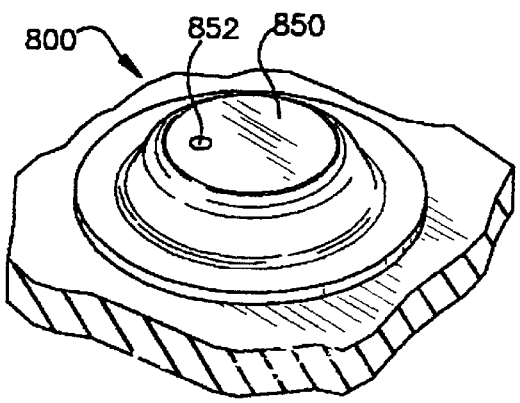
Figure 8B:
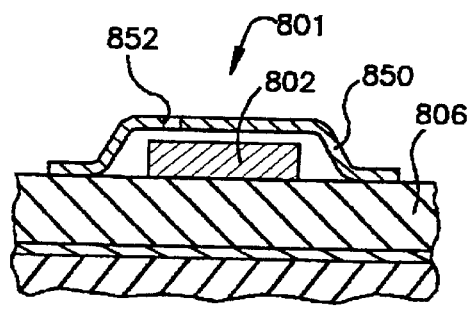
Figure 11A:
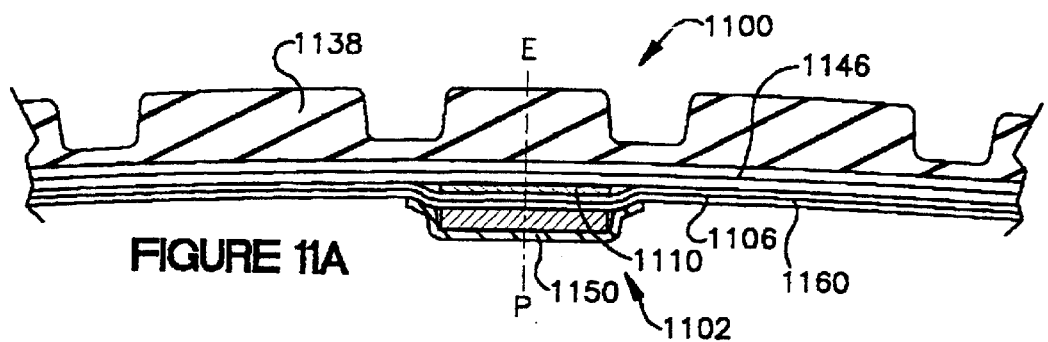
Figure 11B:
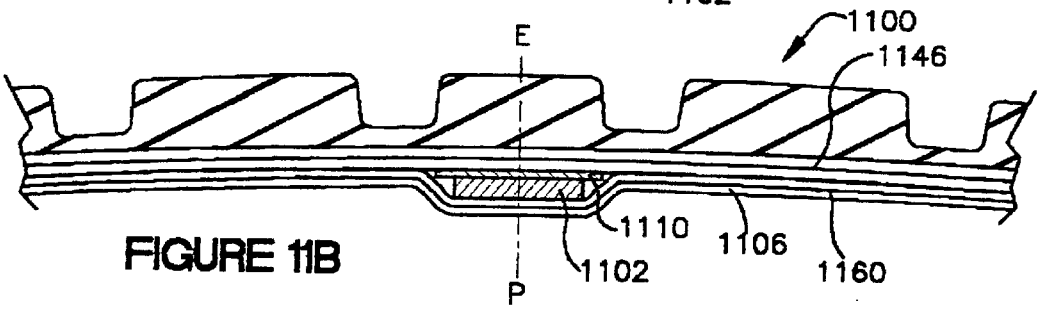
Figure 11C:
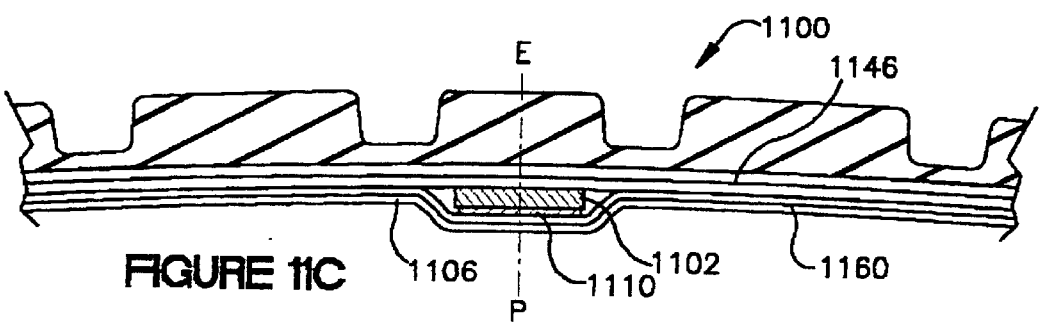
Figure 11D:
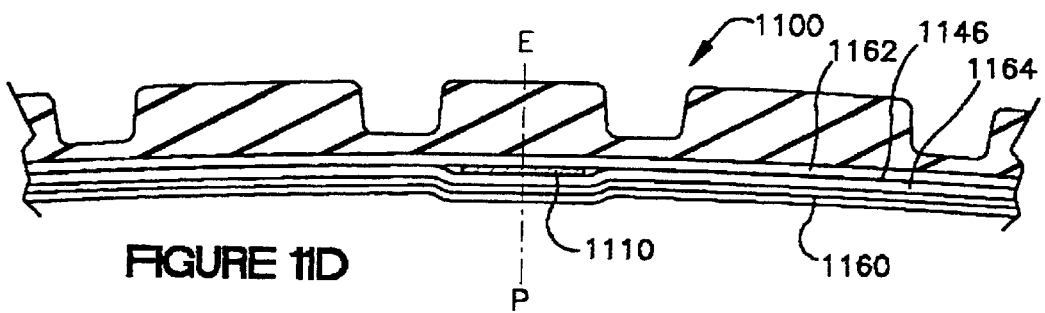
Figure 12:
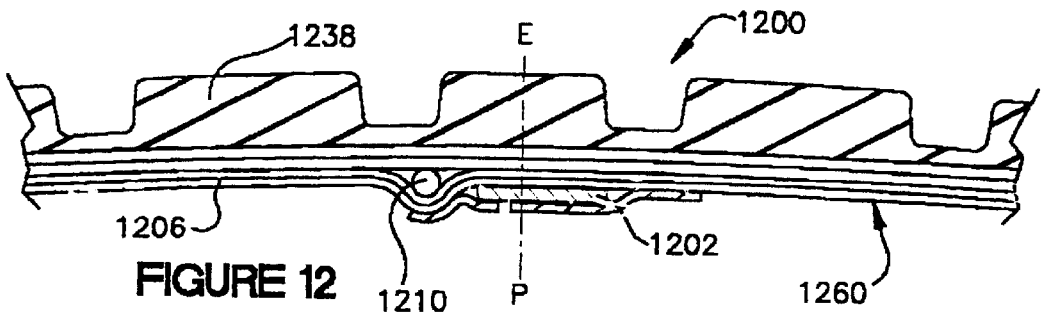
Figure 13:
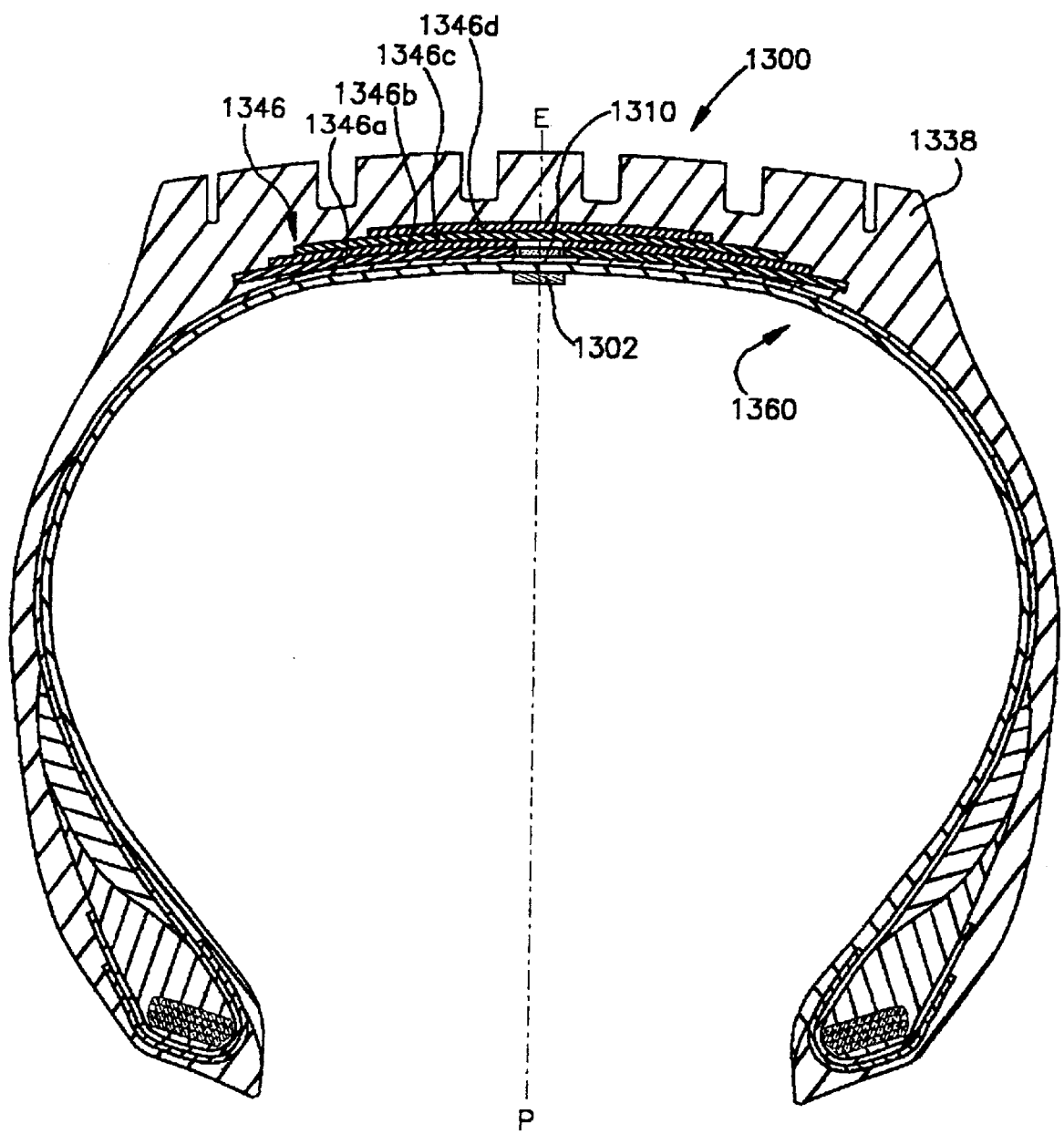
Figure 14:
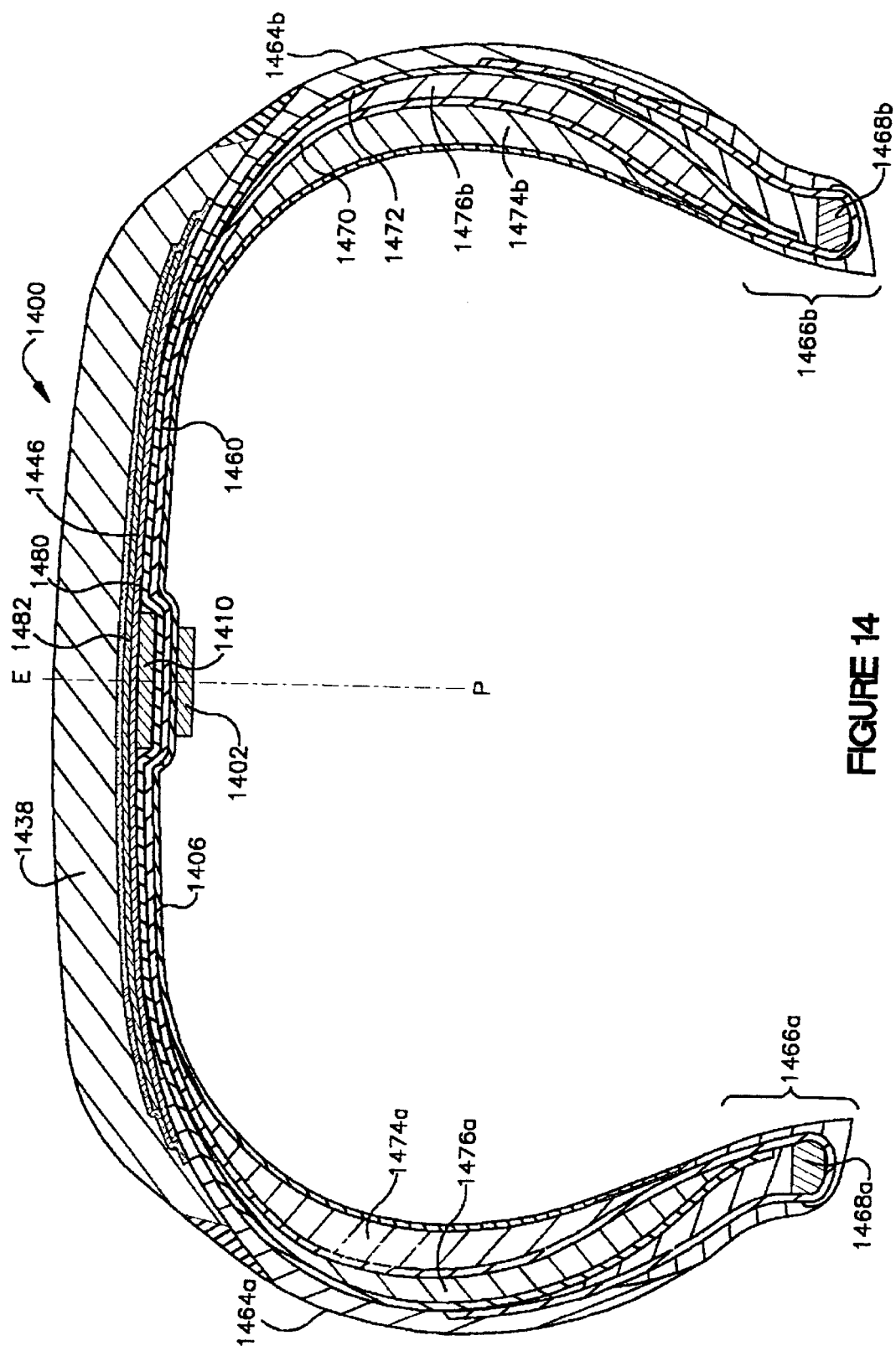

The structure, operation, and advantages of the preferred embodiments of the invention will become further apparent upon consideration of the following description taken in conjunction with the accompanying drawings, wherein:

FIG. 1A is a schematic side view of a tire containing a prior art transponder;

FIG. 1B is a cross-sectional view of the tire through line 1B—1B of FIG. 1A;

FIG. 1C is a second cross-sectional view through line 2C—2C of the tire of FIG. 1A, where the tire has been rotated 180;

FIG. 2A is a schematic side view of a tire containing a transponder and a generalized hoop/loop;

FIG. 2B is a cross-sectional view through line 2B—2B of the tire of FIG. 2A;

FIG. 2C is a second cross-sectional view through line 2C—2C of the tire of FIG. 2A, where the tire has been rotated 180;

FIG. 3 is a oblique view of an generalized prior art transponder and coil;

FIG. 4 is a plan view of the transponder of FIG. 3 shown in relation to a tire bead;

FIG. 5 is a meridional cross-sectional view of a runflat tire having a tread-supporting structural hoop;

FIG. 6 is a close-up view of the central portion of the FIG. 5, showing a transponder embedded radially outward of the structural support hoop;

FIG. 7A is an oblique view of a prior art patch-type transponder shown mounted on the inside wall of a tire;

FIG. 7B is a cross-sectional view of the transponder of FIG. 7A;

FIG. 8A is an oblique view of a generalized patch-type transponder;

FIG. 8B is a cross-sectional view of the generalized patch-type transponder of FIG. 8A;

FIG. 9 is a meridional cross-sectional view of a runflat tire having a tread-supporting structural hoop and a patch-type transponder disposed near the hoop;

FIG. 10 is a meridional cross-sectional view of a runflat tire with a non-structural hoop/loop disposed between the carcass structure and the belt structure;

FIG. 11A is a close-up view of the central portion of FIG. 10, showing a patch-type transponder mounted inside the tire;

FIG. 11B is a close-up view of the central portion of a tire incorporating a hoop/loop and an embedded transponder disposed radially inward of the hoop/loop;

FIG. 11C is a close-up view of the central portion of a tire incorporating a hoop/loop and an embedded transponder disposed radially outward of the hoop/loop;

FIG. 11D is a close-up view of the central portion of a tire incorporating a hoop/loop disposed between the belts of the belt structure;

FIG. 12 is a close-up cross-sectional view of a patch-mounted transponder and a cable-type hoop/loop disposed between the carcass structure and the belt structure;

FIG. 13 is a close-up cross-sectional view of a hoop/loop disposed between the two halves of a split-belt tire; and FIG. 14 is a meridional cross-sectional view of a runflat tire incorporating an electrically conductive loop/hoop between the carcass structure and the belt structure.

DEFINITIONS

"Apex" means an elastomeric filler located radially above the bead core and between the plies and the turnup plies.

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chaffers.

"Belt structure" means at least two annular layers or plies of parallel cords, woven or unwoven, underlying the tread, unanchored to the bead, and having both left and right cord angles in the range from 18 to 30 relative to the equatorial plane of the tire.

"Breaker" is a word more generic than belt and includes unanchored plies underlying the tread having cord angles with respect to the equatorial plane forming angles, either left or right, up to 90 degrees with respect to the equatorial plane of the tire.

"Carcass" means the tire structure apart from the belt or breaker structure, tread, undertread, and sidewall rubber over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands of which the plies in the tire are comprised.

"Cord Angle" means the acute angle, left or right in a plan view of the tire, formed by a cord with respect to the equatorial plane;

"Equatorial plane" means the plane perpendicular to the tire's axis of rotation and passing through the center of its tread; or the plane containing the circumferential centerline of the tread.

"Inner" means toward the inside of the tire and "outer" means toward its exterior;

"Innerliner" means the layer or layers of elastomer or other material that form the inside surface of a tubeless tire and that contain the inflating fluid within the tire.

"Insert" means the same as "wedge insert," which is the crescent- or wedge-shaped reinforcement typically used to reinforce the sidewalls of runflat-type tires; it also refers to the elastomeric non-crescent-shaped insert that underlies the tread.

"Interrogator" refers to a device that interrogates a transponder and, in the case of a passive transponder, provides electrical energy to the transponder so that the latter can transmit energy to the interrogator, the antenna of which might be mounted near the wheel of each tire on a vehicle, or it might be hand-held by a technician who is examining a specific tire that is either mounted on a vehicle or not mounted on a vehicle.

"Lateral" means a direction parallel to the axial direction.

"Meridional" refers to the meridian direction of a tire as, for example, a meridional cross-sectional view in which the plane of the cross section contains the tire's axis.

"Normal inflation pressure" means the specific design inflation pressure at a specified load assigned by the appropriate standards organization for the service condition for the tire.

"Normal load" means the specific design inflation pressure and load assigned by the appropriate standards organization for the service condition for the tire.

"Ply" means the same as "carcass ply," which is a cord-reinforced layer of rubber-coated meridionally deployed or otherwise parallel cords.

"Radial" and "radially" mean directions radially toward or away from the axis of rotation of the tire.

"Radial ply structure" means the one or more carcass plies or which at least one ply has reinforcing cords oriented at an angle of between 65 and 90 with respect to the equatorial plane of the tire.

"Radial ply tire" means a belted or circumferentially-restricted pneumatic tire in which at least one ply has cords which extend from bead to bead are laid at cord angles between 65 and 90 with respect to the equatorial plane of the tire.

"Runflat" or "runflat tire" is a pneumatic tire that is designed to provide limited service while uninflated or underinflated.

"Shoulder" means the upper portion of sidewall just below the tread edge.

"Sidewall" means that portion of a tire between the tread and the bead.

"Wedge insert" means the same as "insert," which is the sidewall reinforcement used in runflat tires.

DETAILED DESCRIPTION OF THE INVENTION

An antenna is an essential feature of a radio frequency (RF) transponder. There are two main configurations and locations for the antenna of a tire transponder: (i) a "coil" antenna is typically located with the transponder in a single, self-contained communicating package of transponder hardware; and (ii) a "loop" antenna, which extends from the transponder about the circumference of the tire.

Given the tire-manufacturing challenges presented by installing a lengthy loop antenna system that extends about the circumference of the tire, a transponder having a coil-type antenna is preferred. Such transponders can be quite small, allowing them to be imbedded within a tire during manufacturing of the tire, or such transponders, measuring on the order of the size and shape of a half-dollar coin, might be bonded as a "patch" to the inside of a tire after the tire is sold or even after the tire has seen extended service.

The present invention relates to the first type of transponder described above, the one having a small coil antenna. However, due to specific problems relating to interrogator/transponder communication as described in more detail below, the coil-type transponder antenna can be made to communicate more efficiently with an interrogator antenna located external to the tire if the transponder's coil antenna is used in conjunction with a large, continuous, electrically conductive loop.

FIGS. 1A, 1B and 1C illustrate three views of a prior art tire-installed coil-type RF transponder system 100 comprising a passive transponder 102 disposed within a pneumatic tire 104. The passive transponder 102 is mounted in any suitable manner to an inner surface 106 of the tire, such as using the techniques described herein below and in the any of the patents and patent applications cited herein. An interrogator antenna 108 is disposed on the vehicle, adjacent the tire 104, such as in a wheel well of the vehicle directly next to the tire. The interrogator antenna 108 provides electromagnetic radiation for powering the transponder 102 and receives data-carrying signals from the transponder.

As illustrated in FIGS. 1A 1B and 1C the interrogator antenna 108 is disposed at the "12 O'clock" orientation with respect to the tire 104, i.e., near the top portion of the vehicle-mounted tire. It should be understood that the interrogator antenna 108 may be disposed at any position suitable for RF coupling with the transponder 102 without interfering with movement (rotation, steering, rebounding) of the tire 104.

The present invention is directed to providing "360-degree readability", which means that the antenna of the interrogator will be able to communicate, from any location about the tire's circumference, with a tire-mounted transponder disposed at any location within the tire, so that a person using a hand-held interrogator would not have to move the antenna around the circumference of the tire in order to communicate with, a tire-mounted transponder. With 360-degree readability, the antenna of the interrogator can be positioned anywhere near the tire's circumference in order to interact with the transponder. In the case of chassis-mounted or on-board antenna systems, as might be used in the continuous monitoring of tire pressure, temperature and other variables of all of the tires on a given vehicle, a preferred location for the antenna of the interrogator is near the top of the tire, preferably above the tire's axis of rotation. This is especially so in the case of front wheels which, when the vehicle is cornering, the frontmost and rearmost portions of each steering tire move laterally, which would affect communication between the interrogator antenna and the transponder if the antenna were disposed in the forward or rearward portions of the vehicle's wheel wells. Thus the over-the-tire location for a vehicle-mounted interrogator antenna is more or less directly above the tire's axis of rotation, allowing the antenna to be equidistant from the tire at all times.

FIGS. 2A,2B and 2C illustrate a generalized tire-mounted RF transponder system 200 (compare 100) comprising a passive transponder 202 (compare 102) disposed within a pneumatic tire 204 (compare 104). The tire-mounted transponder system 200 is similar to the above-described transponder system 100 in the following respects. A transponder 202 is mounted in any suitable manner to an inner surface 206 of the tire. An interrogator antenna 208 (compare 108) is disposed on the-vehicle, adjacent the tire 204, such as in a wheel well of the vehicle directly next to and preferably near the top of the tire 204. The antenna 208 provides RF electromagnetic radiation to the transponder 202, both for powering the transponder and receiving data-carrying signals from it.

This generalized illustration of the tire-mounted transponder system 200 includes an electrically conductive hoop 210 extending circumferentially around the inner surface 206 of the tire 204. The hoop 210 is illustrated as being slightly offset from an axial centerline (equatorial plane) of the tire 204, though this is not necessary to the function of the hoop in relation to the transponder. The hoop 210 is an electrically-conductive member having the function of a primary winding of a coupling transformer of which a coil antenna of the transponder functions as a secondary winding of the functional coupling transformer. Generally, the hoop 210 enhances coupling between the transponder 202 and the external interrogator antenna 208 and can thus be considered as a "coupling element." The hoop 210 is suitably a single turn of electrically conductive material having its ends connected (shorted, or simply electrically continuous) to one another, but it may comprise multiple turns or layers of wire or conductive material which behaves as a single electrically conductive loop. The hoop 210 should have a low electrical resistance, preferably less than 10 ohms.

As illustrated in FIGS. 2A,2B and 2C, the vehicle-mounted antenna 208 is disposed at the "12 O'clock" orientation with respect to the tire 204, such as abreast of a top portion of the tire. It should be understood that the interrogator antenna 208 may be disposed at any position suitable for RF coupling with the transponder 202 without interfering with movement (rotation, steering, rebounding) of the tire.

Regarding the location of an actual or practical hoop 210, it should be understood that the hoop is shown extending circumferentially around the inner surface 206 of the tire 204, slightly offset from the equatorial plane EP of the tire, for illustrative purposes only. It is within the scope of the invention that the hoop 210 may be disposed on the equatorial plane of the tire 204, passing directly underneath, or radially outward of, the transponder 202, and may also be "buried" or embedded in the body of the tire 204. Or the hoop 210 can be located outside of the equatorial plane of the tire. Regarding the hoop 210 itself, it should be understood that the hoop is an exemplary complete, endless, short-circuit loop of any electrically-conductive material suitable to function as the above described transformer coupling element. The hoop 210 is suitably constructed of material such as, for example, brass-plated high-tensile strength steel, that exhibits good mechanical strength and resistance to corrosion and fatigue in the environment of an interior of a pneumatic tire. For example, the hoop 210 may comprise multiple strands of such wire, which optionally may be plated (e.g., with nickel or gold).

It is within the scope of the invention that the hoop 210 may be formed as two or more lengths of wire joined in any suitable manner (such as by wrapping, welding or soldering) at their ends to form a continuous hoop extending around the entire circumference of the tire 204.

In summary, the present invention relates to the use of coil-type transponder systems, in which the transponder's coil antenna is part of a transformer in which the transponder's coil antenna (which may have a ferrite or other magnetic material as a core) operates as the secondary winding through which the transponder can receive energy from and communicate with a transponder interrogator device located external to the tire. The primary winding of such a transformer is a large-diameter electrically conductive and continuous loop mounted within a tire.

Use of Tire Bead as a Primary Winding Hoop Coil

One of the two spaced-apart metallic beads of a tire can satisfy the above described requirements of a large-diameter transformer primary winding mounted within a tire. In fact, the use of one of the tire beads as the primary winding of an interrogator/transponder system is described in the above referenced and commonly held U.S. Pat. Nos. 5,181,975 and 5,218,861.

However, the disadvantage in using one of the tire's two beads as the primary winding of the transformer linking the transponder to the interrogator is the electromagnetic influence associated with the electrically conductive metallic wheel upon which the tire is mounted and to which the bead is closely adjacent. Accordingly, the present invention addresses the installation and use of a continuous hoop or loop, electrically conductive tire element disposed far from the beads, as preferably in or close to the tread region of the tire. Such a hoop might or might not serve structural functions within a tire in addition to performing the function of a primary transformer winding. For example, an electrically conductive hoop of metal might be installed in the region of the tread, from which location the loop or hoop can serve the function of being an electromagnetic linking element in the transponder/interrogator system. That is, such a loop or hoop might be installed in a new tire for the specific purpose of being the primary winding of the transformer. Or the hoop might be installed in a tire as a structural element, e.g., as a tread reinforcing structure of the sort described further below as well as in European Patent Application 99100920.0, having a common assignee with the present invention and incorporated by reference herein and which is described in detail, with diagrams, below. Such structural hoops or loops, when performing the additional function of being a transformer primary winding in a transponder system, allow a transponder to be disposed in a specific place within a tire, (as near the tread region) while maintaining the interrogator communication with the transponder from any location about the tire's major circumference, even from the opposite side of the tire from the interrogator. For example, an interrogator would be able to communicate with a tire-mounted transponder whose location within the tire might be on the far side of the large diameter of a tire from the location of the antenna of an interrogator device.

Thus, the present invention provides a tire with a continuous circular loop or hoop that can act as the primary winding of a transponder-linking transformer, regardless of whether a transponder is installed in the tire during manufacture of the tire or as an after-market add-on. In the latter instance, a tire-status transponder might be installed within a newly installed tire or within a used tire for the purpose of measuring, monitoring and transmitting tire pressure and/or temperature data, or other variables such as, tire mileage or tire rotational speed. The installation of hoop within the tire during its manufacture would thus provide the primary winding of the aforementioned transformer, whether or not a transponder is also installed during manufacture of the tire or is installed after manufacture of the tire or is never installed at all.

The present invention can also provide for a primary transformer loop within a region of the tire that is far removed from an electrically conductive metallic wheel assembly, the loop being used in conjunction with a tire-status and/or tire-identification transponder that is also installed within a tire during the tire manufacturing process. Examples will be given and discussed below.

The present invention can also employ the electrically conductive structural elements such as the metallic tread-reinforcing bead described in TIRE WITH IMPROVED RUNFLAT DESIGN, filed Jan. 20, 1999 as European Patent Application 99100920.0, as the primary winding coupling element described above.

Hoops and Loops

The phrases "loop or hoop" and "hoop/loop" as used herein are intended to refer to an electrically conductive, single-turn loop or hoop disposed more or less radially inward of the tread of a tire. It is intended that, unless otherwise stated or obviously implied, the phrases "loop or hoop" and "hoop/loop" be synonymous with the words "loop" and "hoop," which would themselves also be mutually synonymous in the context of this disclosure unless otherwise stated (as in instances where the transponder's coil-type antenna might be referred to as a "loop"). It is acknowledged that the term "hoop" implies or suggests a structure having greater structural rigidity than is implied or suggested by the term "loop". Within this disclosure, the words "hoop" and "loop" and variations of the phrase "hoop or loop" all refer to electrically conductive tire components disposed more or less radially inward of a tire's tread region. The hoop/loop might have a structural function within the tire as well as providing the aforementioned transformer primary-winding, coupling element function that is required so that the interrogator external to the tire can achieve 360-degree readability of the transponder within the tire. Or the hoop/loop might be installed within the tire for the sole non-structural purpose of providing the primary-winding transformer function mentioned above and discussed more fully below. In the post-production or after-market installation of a tire-status monitoring transponder within a tire, the transponder might be attached as a patch that is bonded by adhesive and/or heat to the inside of a pneumatic tire designed for use on trucks or passenger vehicles. Such an aftermarket-installed transponder would be able to interact electromagnetically with the hoop/loop installed within the tire during manufacture, provided the transponder's antenna, secondary loop or coil winding is appropriately aligned with the electric and magnetic field lines associated with the large-diameter hoop/loop that functions as the primary winding of the electromagnetically linking transformer.

An electrically conductive and continuous loop/hoop installed within a tire during its manufacturing phase would allow a transponder to also be installed during tire production, in which case the transponder would have the potential to be used in tire identification even during the manufacturing process, which would allow for tracking of individual tires during production), or and afterward, as stated, after the tire is sold or has been in use.

Referring to FIG. 3, there is shown in oblique view a prior art integrated circuit RF transponder system 300, as disclosed in the '861 patent, having a transponder 320 and substantially planar antenna coil or antenna coil 322. The transponder 320 includes an integrated circuit 324 mounted on a circuit board 326. The circuit board 326 is adhered to the antenna coil 322 with a suitable epoxy or other adhesive compatible with the polyester insulation provided on the wires 308 forming the antenna coil 322. FIG. 4 is a view of a transponder system 400, as disclosed in the '861 patent, (compare 300) from a direction perpendicular to the plane of the transponder's antenna coil 422 mounted on ply 430 of a tire near the bead wires 432. The long lower side of the oblong or elongated antenna coil 420 is positioned near (adjacent) the bead wires 432, which are partially shown. The lines 434 represent the reinforcing cords of the ply 430. The lines of X's depict the magnetic field lines uniformly distributed along the circumference of the bead wires 432 when alternating electrical current is induced in the bead by an interrogator mounted external to the tire. The bead wires 432 correspond, in their electromagnetic role, to the hoop 210 in FIGS. 2A,2B and 2C. The magnetic field lines vary in intensity in an exponentially decreasing manner as a function of radial distance from the bead wires 432. The bead wires 432, in other words, act as the above-described primary winding of a transformer, coupling the magnetic field to the coil antenna secondary winding 420 in the transponder system 400.

A printed circuit board 426 has openings or holes 428 through which elastomer may flow to increase the adhesion of the transponder 440 (compare 340) to the other tire components. The holes 428 can have a conductive plating material for use as programming and test pads during transponder manufacture. A capacitor 438 is provided for electrical connection in parallel with the coil winding, the leads (not shown) of which are connected to electrodes of the transponder system 400 and its integrated circuit 424 substantially in the manner of the antennas illustrated and described in the U.S. Pat. No. 4,911,217 patent of Dunn et al. The numeral 436 denotes a space or location in or on the circuit board 442 that receives a pneumatic pressure transducer.

Note that the annular tensile member or bead 432, has a curvature. The antenna coil 422 need not precisely follow this curvature in order to achieve adequate electromagnetic coupling as disclosed in the '861 patent of Brown et al.

Non-Structural Hoops and Loops

Referring now to FIGS. 2A,2B and 2C, there is shown a hoop 210 disposed within a tire 204. The sole purpose of the hoop 210 is to perform the role of being the primary winding of the transformer system described above. Such a hoop/loop 210 need not have a structural role in the tire. That is, if a non-structural loop or hoop of electrically conductive material, as shown in those FIGS. 2A,2B and 2C, could be easily and reliably secured within a tire, perhaps by being bonded to the innerliner with an adhesive tape, then one low-cost solution would be to available to installing such hoops within tires either during the tire manufacturing process or subsequent to it. However, due to the cyclical flexural requirements of a tire, and to the temperature extremes to which tires are exposed, the use of tape to bond such a loop 290 securely inside a tire is not preferred.

A more practical and preferred way to reliably incorporate a non-structural, electrically conductive loop within a tire would be to dispose it within the belt structure or between the belt structure and the carcass structure.

Structural Hoops as Primary Windings

FIG. 5 shows in meridional cross-section, a runflat tire 500 according to the present invention having a tread 538 incorporating a tread-reinforcing bead, or hoop 510, comprising a bundle of metal cords or wires 540 embedded within an elastomeric support 542 disposed between the carcass ply structure 544 and the belt structure 546 in the equatorial plane EP. In this example, the hoop 510 serves as a structural hoop whose structural function related to the runflat structure and capabilities of the tire 500. Specifically, the bead or hoop 510 inhibits tread lift during runflat operation, and its rigidity provides additional load-carrying capacity to the uninflated tire.

FIG. 6 is a close-up cross-sectional view of the central portion 600 of the tire 500 shown in FIG. 5, with a transponder 602 disposed radially outward of the hoop 610 (compare 510). The axis of the coil 648 of the transponder 602 is more or less parallel to, or has a parallel component to the axis (not shown) of the hoop 610. In this example, the tread-reinforcing structural hoop 610 is electrically conductive and electrically continuous in a single electrical loop about the circumference of the tire and has an electrical resistance of preferably less than 10 ohms. Such a structural hoop 610 can perform the role of a primary transformer winding in relation to the secondary winding that is the transponder coil 648 (which as illustrated has an axis parallel to that of tire 500 and is wound about a ferrite core), in addition to its runflat tire-reinforcing structural function. Those skilled in the art will recognize that the transponder 602 in this embodiment would have to be installed during manufacture of the tire. However, as will be discussed below, the structural element 510,610 shown in FIGS. 5 and 6, respectively, could also accommodate a transponder "patch" such as might be installed either during manufacture of the tire or after the tire is sold, as perhaps during retreading. Transponder patches are discussed below.

The specific location of the transponder 602 shown in FIG. 6 (i.e. radially outward of the structural hoop 610) would serve well for a transponder whose main information-related functions might be the transmission of tire identification data or data related to tire temperature or tire rotational speed or total mileage. However, the transponder location as shown would not necessarily be useful for the monitoring of tire pressure. However, were the transponder 602 to be disposed radially inward of the hoop 610, a small hole of the sort described in U.S. Pat. No. 5,500,065, to Koch et al., might be provided to allow communication of pressure information between the transponder and the inside of the tire. Disposition of the transponder 602 radially inward of the hoop 610 would not obviate the use of the hoop as a primary winding in the transformer through which the transponder could achieve electromagnetic communication with an interrogator device external to the tire, so long as the axis of the core of the transponder coil 648 is more or less parallel to the axis (unshown) of the hoop 610, which would be more or less coincident with the axis of the tire.

"Patch" Transponders

U.S. Pat. No. 5,500,065, to Koch et al. and entitled, "Method for Embedding a Monitoring Device with a Tire During Manufacture," describes several strategies by which to install a transponder during the tire manufacturing process. The Koch patent includes a patch-like transponder whose appearance suggests that it could as well be installed subsequent to the tire manufacturing process.

FIG. 7A is an oblique view of a prior art patch type transponder package 700 having a cover 750 secured to the inner wall 706 of a tire. The cover 750 has an adhering surface which secures a monitoring transponder (not shown) to the tire's inner wall 706 such as, specifically, the innerliner. Such a cover 750 can be made of rubber or other materials and can be secured by vulcanization, including chemical cure, or secured by adhesive and/or heat to the inner surface of a tire. A slit-type opening 752 communicates between the inside of the tire and the transponder (not shown) beneath the cover 750. FIG. 7B is a cross-sectional view of a transponder 702 disposed between the patch cover 750 and the innerliner 706.

FIG. 8A is an oblique view of a generalized after-market patch cover 800 with an opening 852 beneath which is a transponder (not shown). FIG. 8B is a generalized cross-sectional view of the patch-on transponder package 801 with its patch cover 850 shown covering a generalized passive transponder 802 (compare 602), including its coil antenna (not shown), affixed to the innerliner 806 of a tire. The cover 850 contains a hole 852, which might be round or oblong or rectangular, communicating between the transponder 820 and the inside of the tire.

The generalized "patch" type transponder 801 shown in FIGS. 8A and 8B is intended to represent, for the purposes of this disclosure, a transponder mounting arrangement that can be permanently attached to a tire's innerliner either during manufacture of the tire or anytime subsequent to manufacture of the tire. Such a generalized patch transponder 801 will be shown in subsequent figures in this disclosure. It is not intended to represent a specific shape or design or to imply a specific transponder type, but rather to indicate only that transponders can be readily installed either during or after manufacture of a tire. More specifically, a transponder can be installed within a tire during the tire's manufacturing process or afterwards, and it need not specifically be embedded within the tire's elastomeric matrix as shown in FIG. 6. The transponder is located on the radially inner side of the tire's radial ply and can be installed before or after the tire "shaping" process commonly used during its manufacture prior to lamination of the belt and tread materials. Advantageously, the conductive hoop in the tire can be added after the shaping process, which is desirable if it is substantially inextensible.

Furthermore, while the patch-type transponder devices 700,801 shown in

FIGS. 7A and 8B includes a slit 752 or hole 852 through which the air pressure in the tire can communicate with the internal transponder 702,802 disposed beneath the patch cover 772, such a slit or other opening is not necessarily required in order to sense and monitor a tire's internal pressure or other parameters. For example, U.S. Pat. No. 5,731,754, to Lee, Jr., et al. and entitled "Transponder and Sensor Apparatus for Sensing and Transmitting Vehicle Tire Parameter Data," describes a pressure-sensing transponder system that is able to monitor tire pressure and temperature data through an elastomeric membrane.

In the remainder of this disclosure, the numeral 801 or its equivalent will be used to refer to a generalized passive transponder that is affixed to a tire by means of a patch that is bonded to an inside surface of a tire either during manufacture of the tire or after manufacture. The numeral 801 will be used to refer to the generalized transponder, including both the patch cover and the transponder beneath the cover.

A goal of the present invention is of course to provide for 360-degree readability of the transponder, i.e., from any location around the circumference of the tire. Thus, whether a given transponder is installed during manufacture of the tire or afterwards, and whether or not a given transponder is embedded within a tire's elastomeric matrix, one goal of the present invention is to provide an electromagnetic linkage between a transponder and a hoop-type or loop-type primary winding which enables the 360-degree readability of a transponder by one or more external-to-the-tire interrogator antennas, whether the latter are hand-held or mounted permanently or semipermanently upon a vehicle.

FIG. 9 is a cross-sectional view of an example of a patch-type transponder 902 (compare 801) disposed upon the innerliner 906 of a runflat tire 900 having, as does the tire illustrated in FIG. 6, an embedded structural hoop 910 having the requisite electrical properties to serve as the primary winding of the above-described transformer linkage between a tire-mounted, patch-type transponder device 902 and an external interrogator antenna (not shown). The patch-type transponder 902 shown in FIG. 9 should be taken to represent either a factory-installed unit or an after-market unit. And while FIG. 9 shows a patch-type transponder 902 disposed outside of the equatorial plane EP of the tire, the transponder could as well lie directly on or some distance to either side of the equatorial plane, the sole criterion of importance in the geometric relationship of the patch transponder 902 and the reinforcing hoop 910 being the above-described electromagnetic linkage between the hoop 910, as a primary winding of a transformer, and the transponder coil (not shown) of transponder 902, as the secondary winding.

Referring to FIG. 9, the electrically conductive structural hoop 910, disposed between the carcass structure 960 and the belt structure 946, could be abbreviated into a non-structural wire, cable or flat ribbon or strip of metal as shown in FIG. 10, where a ribbon 1010 of conductive material is shown disposed between the carcass structure 1060 and the belt structure 1046 of a tire 1000 which is of the sidewall-reinforced runflat design. Those skilled in the art of tire construction should understand that the installation of such a ribbon-like electrically conductive hoop/loop 1010 would obviously take place during that phase of the tire-building process when the tread and breaker assembly is installed upon the green carcass that has been blown up into the characteristic toroidal shape of a tire. In other words, the ribbon-like loop 1010 would be installed as part of the combination of tread and the belt structure. The ribbon loop 1010 would coact with transponder 1002, preferably disposed on the inner side of carcass 1060.

FIG. 11A is a view of the central portion 1100 of the tire section 1000 shown in FIG. 10, with a patch-type transponder 1102 bonded radially inward of the innerliner 1106 and near the electrically conductive ribbon-shaped hoop/loop 1110 disposed radially outward of the carcass structure 1160 and radially inward of the belt structure 1046. The patch transponder 1102, affixed to innerliner 1106, includes a cover 1150 which is bonded to the innerliner 1106. While the patch transponder 1102 is shown centered on the equatorial plane EP along with the hoop 1110, it is not necessary that either the transponder or the hoop be in the same plane with one another nor that either be in or on the tire's equatorial plane, but only that the hoop and the transponder be disposed in relation to one another in such a way that the hoop 1110 and the coil of the passive transponder 1102 are in electromagnetic communication with one another.

The illustrations that follow all use the same numerical designations for tire parts that are essentially similar.

FIG. 11B is a view of the central portion 1100 shown in FIG. 10, with an embedded transponder 1102 disposed radially inward of the electrically conductive hoop 1110. While the embedded transponder 1102 is shown centered on the equatorial plane EP along with the loop or hoop 1110, it is not necessary that either the transponder or the hoop be in the same plane with one another nor that either be on or in the tire's equatorial plane, but only that the hoop and the transponder be disposed in relation to one another in such a way that the hoop 1110 and the coil of the embedded passive transponder 1102 be in electromagnetic communication with one another.

If the transponder 1102 is intended to monitor and transmit tire pressure information, then clearly its pressure transducer (not shown) will have to be in communication with the inside of the tire. As has been stated, there are prior art methods by which holes can be created in the innerliner 1106 and the carcass ply 1160, and there also exist pressure transducers that are able to monitor pressure within a tire even though the transducer is separated from the inside of the tire by a membrane of gas-impermeable material.

FIG. 11C is similar to FIG. 11B except that the embedded transponder 1102 is disposed radially outward the hoop 1110, and both the hoop and the transponder are radially outward of the carcass structure 1160 and radially inward of the belt structure 1146. While the embedded transponder 1102 is shown centered on the equatorial plane EP along with the loop or hoop 1110, it is not necessary that either the transponder or the hoop be in the same plane with one another nor that either be on or in the tire's equatorial plane, but only that the hoop and the transponder be disposed in relation to one another in such a way that the hoop 1110 and the coil of the embedded passive transponder 1102 be in electromagnetic communication with one another. Clearly, the disposition of the transponder 1102 in a location that is radially outward of the hoop 1110 will present difficulties with respect to the monitoring of gas pressure within the pneumatic tire, but allowance for a communicating hole between the inside of the tire and the pressure transducer associated with the transponder 1102 can be achieved by the various methods mentioned above for creating the necessary communicative channels (not shown).

FIG. 11D shows yet another proposed location the hoop 1100, that is within the belt structure 1146, between the two or more belts 1162,1164 of the belt structure 1146. No transponder is shown. A transponder might be installed as a patch-on type, during or after manufacture of the tire, or a transponder might be embedded in the tire near to the hoop 1102 as shown in the previous FIGS. 11B and 11C. The hoop 1110 could be installed upon a green tire carcass at the same time that the tread and belt structure are installed or as part of the tread/belt structure package. While the hoop 1110 is shown centered on the equatorial plane EP, it is not necessary that the hoop 1110 be in the equatorial plane nor that any transponder (not shown) be centered upon the equatorial plane as long as the hoop and transponder be disposed in relation to one another in such a way that the hoop 1110 and the coil of the transponder be able to achieve reliable electromagnetic communication with one another.

While the FIGS. 11A,11B,11C and 11D show the hoop 1110 in various locations with respect to the belt structure 1146, the preferred and most practical location of the hoop/loop is radially outward of the carcass structure 1160 which, during manufacture, as those skilled in the art of tire building will know, must undergo an expansion from a cylindrical shape to a toroidal shape prior to the installation of the tread and belts and the hoop. The transponder can be installed by any desired means, such as the patch cover method as described above (see FIG. 7A). Also, it is within the spirit and scope of the present invention that the loop or hoop need not be centered upon the equatorial plane of the tire. Furthermore, the hoop 1110 need not comprise a flat, ribbon-like homogeneous electrically conductive material. For example, FIG. 12 shows a patch-type transponder 1202 bonded to the radially inward side of the innerliner 1206 of a tire 1200 in which a multi-strand cable 1210 of electrically conductive material has been wound about the radially outward perimeter of a blown-up green tire carcass prior to installation upon the carcass of the tread and breaker assembly. The patch-type transponder 1202 could be installed either during manufacture of the tire or afterward. FIG. 12 shows the patch-type transponder 1202 and the cable hoop 1210 not centered on the equatorial plane EP, with the transponder additionally being outside the plane of the cable hoop 1210, thus indicating that a tire designer incorporating the present invention has some latitude in the design of a tire-mounted transponder system employing the hoop primary transformer winding as part of the system with which the transponder interacts with the antenna of the transponder interrogator that is external to the tire. The hoop 1210 could as well be used in conjunction with a transponder that is embedded in the tire during manufacture of the tire.

FIG. 13 illustrates yet another hoop 1310 configuration in a radial medium truck tire 1300 having a divided or split belt structure 1346 comprising two laterally spaced apart belt sections 1346a,1346b and two belt sections 1346c,1346d that are disposed more or less symmetrically with respect to each other about the equatorial plane EP. Medium truck tire 1300 further has a tread 1338 and a carcass 1360. A ribbon-type hoop 1310 shown between the tread 1338 and the carcass 1360 is disposed at a location between the divided belt sections 1346a,1346b. A transponder 1302 can be incorporated as discussed above, for example on the inner side of carcass 1360. While the hoop 1310 is shown to be of the flat, ribbon type, but it could also be made of solid metal having a circular cross section, or it could be a stranded or wound conductive cable as long as it satisfied the electrical criteria listed above.

Second Embodiment

FIG. 14 shows, in meridional cross-sectional view, a runflat radial pneumatic tire 1400 having a tread 1438, two reinforced sidewalls 1464a,1464b, two bead regions 1466a, 1466b each containing an inextensible bead 1468a,1468b, a carcass structure 1460 comprising two radial plies 1470, 1472 and a first pair of wedge insert reinforcements 1474a, 1474b disposed between the innerliner 1406 and the first ply 1470 and a second pair of wedge insert reinforcements 1476a,1476b disposed between the first ply 1470 and the second ply 1472, a belt structure 1446 comprising a first belt 1480 and a second belt 1482, and a ribbon-like, electrically conductive and electrically continuous single-turn hoop 1410 disposed radially outward of the carcass structure 1460 and radially inward of the tread 1438 and the belt structure 1446. The hoop 1410 serves the above described function of being an electromagnetic coupling element between a transponder 1402 that is either embedded, during manufacture of the tire 1400, within the elastomeric material of the tire or installed in the tire, such as in the radially inward surface of the carcass structure 1460, at some period after the tire has been manufactured, as shown. The hoop has a single-turn electrical resistance that is preferably less than 10 ohms and is constructed of material resistant to fatigue and corrosion in the environment of an interior of a pneumatic tire. The hoop might be more or less rectangular in cross section and be made of a solid band of electrically conductive material or made from a multiplicity of strands of electrically conductive material.

The tire 1400 depicted in FIG. 14 is an exemplary embodiment of the present invention. The ribbon-like hoop/loop 1410 is not intended, as mentioned herein above, necessarily to have a rectangular cross section. The hoop 1410 could also be round in cross-section or have some other non-rectangular cross section to be within the spirit and scope of the present invention. That is, the hoop 1410 could be made of a single electrically conductive element such as a metal wire or multiple braided or stranded conductive elements that constitute a single electrically conductive element. The belt structure 1446, which as shown in FIG. 14 comprises two belts 1480,1482, could alternatively comprise more than two belts. Thus, while the hoop 1410 shown in FIG. 14 is shown disposed between the carcass structure 1460 and the belt structure 1446, it could as well be disposed between any two of the two or more belts 1480,1482 or radially outward of the belt structure and radially inward of the tread 1438 in order to satisfy its function as an electromagnetic coupling element. Also, while the electrically continuous single-turn hoop 1410 is shown in FIG. 14 to be more or less contiguous with the equatorial plane EP, the hoop could as well lie outside of the equatorial plane.

It is within the spirit and scope of the present invention that the location of the primary transformer hoop in any of the embodiments described above be located within any lateral location radially inward of the tread region, including the lateral most shoulder portions of the tread region, and that the loop can be of any practical cross-sectional shape, including for example but not limited to the like of a flat ribbon, stranded metal cable or a single wire.

Regarding the various embodiments of the hoop/loop described herein, it should be understood that the hoop is an exemplary complete, endless, short-circuit loop of any electrically-conductive material suitable to function as a coupling element. The hoop/loop is suitably brass-plated high-tensile strength steel which exhibits good mechanical strength and resistance to fatigue and corrosion when placed in the environment of an interior of a pneumatic tire. The hoop may comprise multiple turns of one or more metal filaments or cables, and these may be embedded in a matrix of conductive rubber. The hoop may comprise multiple strands of such wire, which optionally may be plated, e.g., with nickel or gold or a chemically equivalent metallic material). The hoop should have a low electrical resistance, preferably less than 10 ohms. Furthermore, it is within the scope of the invention that the hoop element may be formed as two or more lengths of wire joined at their ends in any suitable manner, such as by wrapping, welding or soldering, to form a complete hoop extending around the entire circumference of the tire.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed:

1. A pneumatic radial ply tire having a tread, a carcass structure, a belt structure, the tire characterized by:

an electrically conductive and electrically continuous single-turn hoop disposed within or radially inward of the tread and belt structure and radially outward of the carcass structure; and a transponder coupled with the hoop.

2. The tire of claim 1 in which the transponder is disposed on an opposite side of the carcass structure from the hoop.

3. The tire of claim 2 in which the electrically continuous single-turn hoop is on a radially outward side of the carcass structure and the transponder is on a radially innerward side of the carcass structure.

4. The tire of claim 2 in which the electrically continuous single-turn hoop lies outside of the equatorial plane of the tire.

5. The tire of claim 1 in which the electrically continuous single-turn hoop has an electrical resistance about its circumference of preferably less than 10 ohms.

6. The tire of claim 1 in which the electrically continuous single-turn hoop is more or less contiguous with the equatorial plane of the tire.

7. The tire of claim 1 in which the electrically continuous single-turn hoop is within the belt structure.

8. The tire of claim 1 in which the electrically continuous single-turn hoop is disposed radially outward of the belt structure and radially inward of the tread.

9. The tire of claim 1 including sidewalls reinforced with inserts for runflat capability.

10. A pneumatic radial truck tire having a tread, a carcass structure, and a divided belt structure located between the tread and the carcass structure, the divided belt structure having two laterally spaced apart sections that are disposed more or less symmetrically with respect to each other about the equatorial plane, the tire being characterized by:

an electrically conductive and electrically continuous single-turn hoop disposed radially inward of the tread, and between the two laterally spaced apart sections of the divided belt structure.

11. The tire of claim 10 in which the electrically continuous single-turn hoop has an electrical resistance about the circumference of the tire of preferably less than 10 ohms.

12. The tire of claim 10 further including a transponder disposed on the opposite side of the carcass structure from the hoop.

* * * * *